United States Patent [19]

Kühnle et al.

[11] 3,708,047
[45] Jan. 2, 1973

[54] ELECTRO-HYDRAULIC SELECTOR FOR THE CONTROL OF MULTIPLE LOADS

[75] Inventors: Willi Kühnle; Walter Frei, both of Friedrichshafen, Germany

[73] Assignee: Zahnradfabrik Friedrichshafen Aktiengesellschaft, Friedrichshafen, Germany

[22] Filed: Jan. 18, 1971

[21] Appl. No.: 107,287

[30] Foreign Application Priority Data

Jan. 20, 1970   Germany..................P 20 02 315.8

[52] U.S. Cl............192/12 C, 74/753, 137/552.5, 137/608, 192/87.19, 235/201 ME
[51] Int. Cl.......F16d 67/04, G06d 1/02, F16h 57/10
[58] Field of Search ..74/753; 235/201 ME; 137/608, 137/552.5; 192/87.18, 87.19, 12 C

[56] References Cited

UNITED STATES PATENTS

| | | | |
|---|---|---|---|
| 3,063,468 | 11/1962 | Dufour | 137/552.5 |
| 3,437,098 | 4/1969 | Stark et al. | 137/552.5 |
| 2,904,070 | 9/1959 | Lynott | 137/552.5 |
| 3,070,295 | 12/1962 | Glattli | 235/201 ME |
| 3,117,593 | 1/1964 | Sowers | 137/624.14 |
| 3,156,157 | 11/1964 | Smith et al. | 137/552.5 |
| 3,312,238 | 4/1967 | Voit, Jr. | 137/552.5 |

*Primary Examiner*—William L. Freeh
*Assistant Examiner*—Thomas C. Perry
*Attorney*—Karl F. Ross

[57] ABSTRACT

A multiplicity of loads, such as the clutches and brakes designed to establish different speed ratios in an automotive gear-shift transmission, are individually actuatable by an array of hydraulic valves forming several cascaded stages, the number of valves per stage increasing as a geometric progression of base 2. Several solenoid relays, selectively energizable with the aid of a coding matrix under the control of a manually operated shift lever, are assigned to the valves of respective stages for jointly displacing them between two alternate positions, thereby completing any one of $2^n$ distinct fluid paths where $n$ is the number of stages.

7 Claims, 4 Drawing Figures

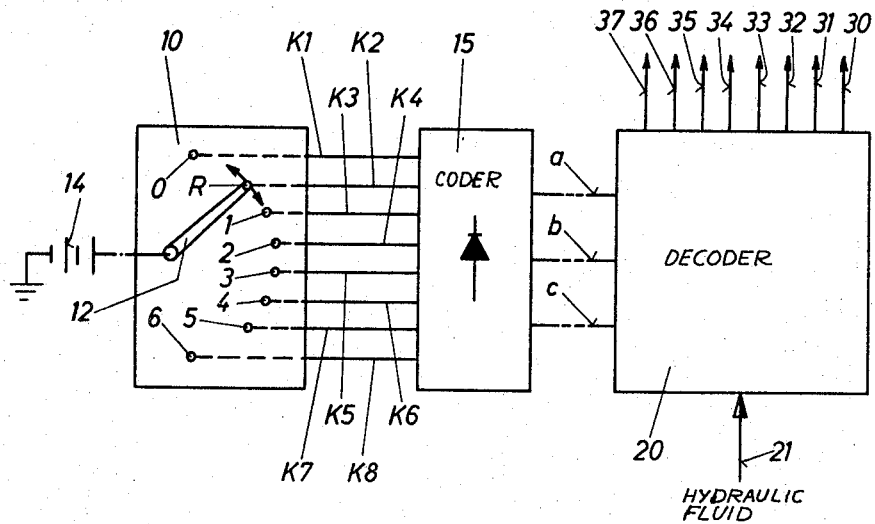
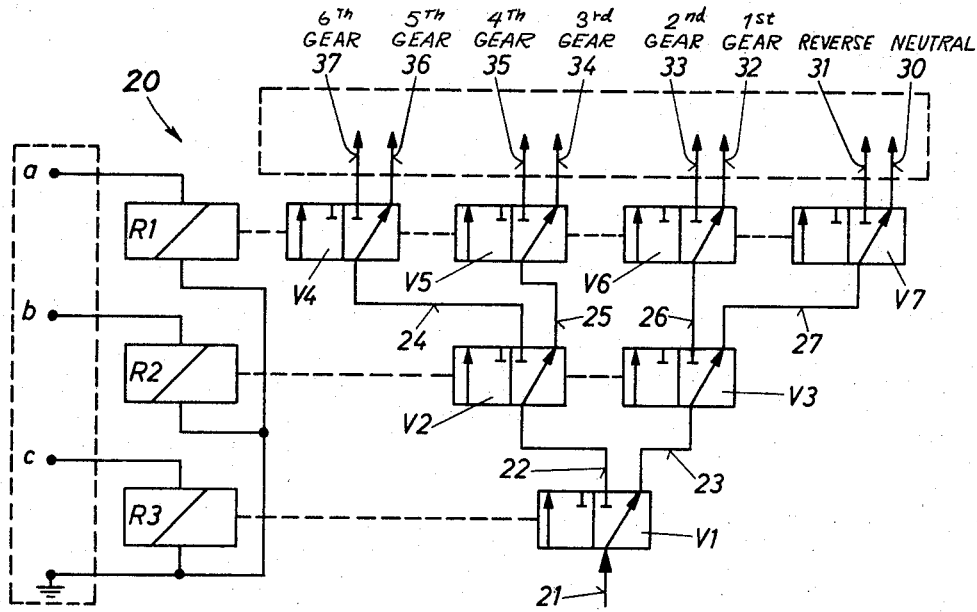

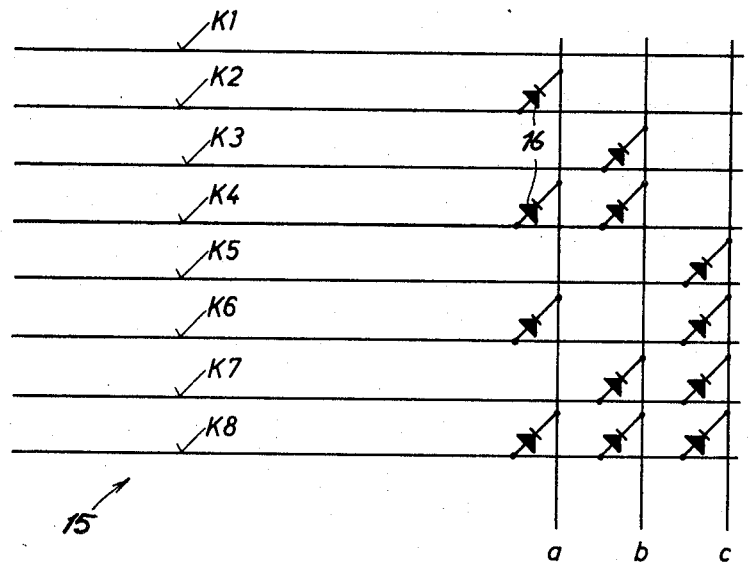

ELECTRO-HYDRAULIC SELECTOR FOR THE CONTROL OF MULTIPLE LOADS

Our present invention relates to a controller for the selective operation of a multiplicity of different loads, particularly (but not exclusively) fluid-responsive couplings such as clutches and/or brakes used in the establishment of different speed ratios in an automotive transmission.

It is known to use hydraulically or, less frequently, pneumatically operated clutches and brakes for selectively immobilizing or interconnecting different elements of a gear train with several degrees of freedom, such as a plurality of cascaded planetary gears, to provide different speed ratios between an engine-driven input shaft and an output shaft in an automotive vehicle. With two such planetary-gear assemblies, a reverse speed and three forward speeds can be obtained; the inclusion of additional planet carriers enables the number of speeds to be increased. Reference in this connection may be made, for example, to commonly owned applications Ser. Nos. 766,679 (Dach et al.), filed Oct. 11, 1968, and 785,678 (Dach), filed Dec. 20, 1968, now U.S. Pat. Nos. 3,583,422 and 3,559,669, respectively, disclosing such planetary-gear systems.

The shifting of gears with the aid of such fluid-actuated transmissions can be carried out either automatically, under the control of such system parameters as engine speed and load, or manually by the displacement of a selector lever or the like. Such a manually operated selector lever is also used in an automatic system to switch from "forward" to "reverse" or "neutral" and to place certain restrictions upon upshifting under specific load conditions.

In either case, the transmission of commands from the manual selector to the fluid-controlling valves can be carried out either mechanically or electrically. In the first instance, the valve assembly must be located relatively close to the selector which in turn has to be within reach of the driver of the vehicle. In the second instance, the connections between the driver's seat and the valve assembly generally include a multiplicity of wires and relays, commensurate with the number of selector positions to be accommodated.

The object of our present invention is to provide an improved controller of the latter type in which the number of electric wires and other circuit elements is considerably reduced.

In accordance with our invention, a controller for the selective operation of $n$ different loads comprises an electro-fluidic matrix with a single supply line for a hydraulic or pneumatic pressure fluid, with $n$ discharge lines leading to the several loads, and with a lesser number $m$ of electric switching elements such as electromagnetic relays or solenoids controlling a number of binary valves to direct the fluid over any one of $n$ different paths from the supply line to a chosen discharge line.

More specifically, the binary valves of the matrix are of the three-way type with a housing having two outlet ports which alternately communicate with an inlet port in a respective position of a movable valve body inside the housing. These valves are arranged in $m$ cascaded stages, the valves of each stage being interconnected for joint displacement between their two operating positions by a respective switching relay. With the number of valves per stage increasing according to a geometric progression of base 2, i.e. from 1 in the first stage to $2^{m-1}$ in the $m^{th}$ stage, the total number $m$ of selectively operable loads equals $2^m$ provided that both positions of each valve are used in the fluidic circuit. Naturally, a lesser number of loads could be served by leaving one or more outlet ports unused, possibly with omission of one or more downstream valves, and by correspondingly reducing the number of relay combinations to be energized simultaneously.

For the energization of these relays, pursuant to a further feature of our invention, we provide a logic network with $n-1$ input leads individually connectable to a current source, via the aforementioned selector lever or a similar setting member, and with $m$ output leads forming part of the operating circuits of the several relays.

The above and other features of our invention will be disclosed in detail hereinafter with reference to the accompanying drawing in which:

FIG. 1 is an overall schematic view of an electro-fluidic control system according to the invention for an automotive transmission;

FIG. 2 is a diagram of a coding matrix included in the system of FIG. 1;

FIG. 3 is a table illustrating the operation of the coding matrix of FIG. 2; and FIG. 4 is a functional diagram of a decoder also included in the system of FIG. 1.

In FIG. 1 we have shown a manual selector 10 including a wiper arm 12 connected to a live terminal (here positive) of a source 14 of direct current, such as the battery of an automotive vehicle, whose other terminal may be grounded. Wiper 12 co-operates with eight bank contacts labeled O (for "neutral"), R (for "reverse", and 1 – 6 for respective forward gears or speed ratios. These bank contacts are connected to a set of eight short leads K1 – K8 terminating at a coding matrix 15 from which three conductors $a$, $b$ and $c$ extend to a decoder 20 having a hydraulic inlet at 21 and eight hydraulic outlets at 30 – 37.

As shown in FIG. 2, coder 15 comprises a set of diodes 16 conductively connecting incoming leads K2 – K8 to certain combinations of outgoing leads $a$, $b$ and $c$. Lead K1, shown for the sake of completeness, is without function and may be omitted entirely.

In the table of FIG. 3 we have indicated by an X the outgoing conductor or conductors $a$, $b$, $c$ energized by the diode matrix 15 upon the energization of any one of its incoming leads K2 – K8; the energization of lead K1, in the "neutral" position O of selector 12 (FIG. 1), is without effect. It will be noted that voltage on lead K2, K4, K6 or K8 energizes the conductor $a$, that voltage on lead K3, K7 or K8 energizes the conductor $b$, and that voltage on any one of leads K5 – K8 energizes the conductor $c$.

As shown in FIG. 4, the decoder 20 comprises a set of three relays R1, R2 and R3, advantageously designed as solenoids, whose operating circuits respectively include the conductors $a$, $b$ and $c$. A set of seven hydraulic valves V1 – V7 of the two-position, three-way type are disposed in a pyramidal array with three cascaded stages, i.e. a first stage represented by valve V1 and controlled by relay R3, a second stage formed by valves V2 and V3 which are jointly operable by relay R2, and a third stage constituted by valves V4 – V7 that are simultaneously displaceable by relay R1.

In their normal positions, in which the valves are maintained in the de-energized stage of their respective control relays, the inlet ports of these valves communicate via diagonal passages with their right-hand outlet ports. Upon the actuation of the associated relay, each valve (illustrated only by its movable body) shifts to the right so that its inlet port communicates via a straight passage with its left-hand outlet port.

Thus, with lever 12 of FIG. 1 on its bank contact O, none of the three relays R1 – R3 is energized and the valves are in their illustrated idle positions, a fluid path being then established from high-pressure inlet 21 via valve V1, a conduit 23, valve V3, a conduit 27, valve V7 and outlet 30 to maintain the transmission in "neutral"; this fluid path may simply recirculate the hydraulic fluid to the low-pressure side of its pump or to an oil sump, with the controlled clutches and brakes biased by associated springs or the like into a state of inactivity. In selector position R, the energization of lead K2 trips the relay R1 so that valve V7 establishes the "reverse" position via outlet 31. In selector position 1, voltage on lead K3 brings on the relay R2 whereby fluid from conduit 23 is passed via valve V3, a conduit 26 and valve V6 to outlet 32. In selector position 2, the simultaneous operation of relays R1 and R2 by the energization of lead K4 causes fluid from conduit 26 to flow via valve V6 to outlet 33. In selector position 3, relay R3 operates to direct fluid from inlet 21 by way of valve V1, a conduit 22, valve V2, a conduit 25 and valve V5 to outlet 34. In selector position 4, the relays R1 and R3 are simultaneously energized whereby the fluid from conduit 25 is directed by valve V3 to outlet 35. In selector position 5, relays R2 and R3 are active so that fluid from conduit 22 passes through valve V2 to a conduit 24 and thence via valve V4 to outlet 36. In selector position 6, finally, all three relays are operated whereby the fluid entering valve V4 from conduit 24 is channeled to outlet 37.

The coder 15 is disposed in the immediate proximity of the driver's seat whereas the decoder 20, linked with the coder by a cable with wires $a$, $b$ and $c$, may be positioned at any convenient location remote from that seat.

It will be apparent that the same principle can be applied to the control of other types of load in an automotive system or elsewhere, e.g. for the dosing of the fuel supply to the engine in discrete steps or for the selective control of a set of wheel brakes.

We claim:

1. A controller for the selective operation of a multiplicity $n$ of different loads, comprising an electrofluidic matrix with a supply line for a pressure fluid, $n$ discharge lines for said fluid leading to said loads, a lesser number $m$ of electric switching elements, and valve means movable by said switching elements to direct fluid from said supply line over $n$ different paths to any one of said discharge lines; a set of $m$ operating circuits for said switching elements; and selector means for energizing said $m$ operating circuits in any of $n$ different combinations to establish a corresponding path; said valve means comprising a multiplicity of two-position valves each with an inlet port and two outlet ports alternatively communicating with said inlet port, said valves being arrayed in $m$ cascaded stages, the valves of each stage being interconnected for joint displacement between the two positions thereof by a respective switching element.

2. A controller as defined in claim 1 wherein said selector means comprises a source of voltage, a logic network with $n-1$ input leads and with $m$ output leads forming part of said operating circuits, and a setting member for connecting said source to any one of said input leads.

3. A controller as defined in claim 2 wherein said logic network comprises a diode matrix.

4. A controller as defined in claim 1 wherein the number of said valves progressively increases in successive stages.

5. A controller as defined in claim 4 wherein the number of valves per stage varies in a geometric progression of base 2.

6. A controller as defined in claim 5 wherein $n = 2^m$.

7. A controller as defined in claim 1 wherein said loads are fluid-responsive couplings for establishing different speed ratios in an automotive transmission.

* * * * *